(12) United States Patent
Jiang et al.

(10) Patent No.: US 9,619,305 B2
(45) Date of Patent: Apr. 11, 2017

(54) LOCALE AWARE PLATFORM

(71) Applicant: International Business Machines Corporation, Armonk, NY (US)

(72) Inventors: Lin Quan Jiang, Shanghai (CN); Yan Min Sheng, Shanghai (CN); Lei Wang, Shanghai (CN); Hai Hong Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/727,940

(22) Filed: Jun. 2, 2015

(65) Prior Publication Data

US 2016/0357617 A1    Dec. 8, 2016

(51) Int. Cl.
    *G06F 9/54* (2006.01)
    *G06F 9/44* (2006.01)

(52) U.S. Cl.
    CPC ............ *G06F 9/542* (2013.01); *G06F 9/4406* (2013.01)

(58) Field of Classification Search
    None
    See application file for complete search history.

(56) References Cited

U.S. PATENT DOCUMENTS

| | | | | |
|---|---|---|---|---|
| 9,385,869 B1* | 7/2016 | Satish | ............ | H04L 9/3247 |
| 2008/0092133 A1* | 4/2008 | Mantere | ............ | G06F 8/61 |
| | | | | 717/174 |
| 2008/0178147 A1 | 7/2008 | Meliksetian et al. | | |
| 2009/0259612 A1* | 10/2009 | Hanson | ............ | H04L 69/32 |
| | | | | 706/47 |
| 2010/0058321 A1* | 3/2010 | Anderson | ............ | G06F 8/65 |
| | | | | 717/173 |
| 2010/0312596 A1* | 12/2010 | Saffari | ............ | G06Q 30/0203 |
| | | | | 705/7.32 |
| 2011/0010690 A1* | 1/2011 | Howard | ............ | G06F 8/456 |
| | | | | 717/120 |
| 2011/0321028 A1* | 12/2011 | Evans | ............ | G06F 8/68 |
| | | | | 717/170 |
| 2013/0013286 A1 | 1/2013 | Rodet et al. | | |
| 2013/0304788 A1 | 11/2013 | DeLuca et al. | | |

(Continued)

OTHER PUBLICATIONS

Wettinger et al., "Enabling Dynamic Deployment of Cloud Applications Using a Modular and Extensible PaaS Environment," 2013 IEEE Sixth International Conference on Cloud Computing, pp. 478-485.

(Continued)

*Primary Examiner* — Tuan Dao
(74) *Attorney, Agent, or Firm* — David Zwick

(57) ABSTRACT

Handling locale information on a computing platform, a computer obtains, in response to an event that an application is pushed to a computing platform, locale information corresponding to the application. The computer determines the type of the application, configures a runtime executable file required by the application according to the locale information corresponding to the application and the type of the application, creates a script for configuring a locale of an operating system on the computing platform consistent with the locale information corresponding to the application, and creates a droplet for the application that includes the configured runtime executable file required by the application and is associated with the created script.

12 Claims, 8 Drawing Sheets

(56) References Cited

U.S. PATENT DOCUMENTS

| | | |
|---|---|---|
| 2014/0075432 A1 | 3/2014 | McGrath et al. |
| 2014/0130036 A1 | 5/2014 | Gurikar et al. |
| 2014/0130038 A1 | 5/2014 | Lucovsky et al. |
| 2014/0215452 A1 | 7/2014 | Hicks et al. |
| 2015/0234651 A1 | 8/2015 | Li et al. |
| 2015/0277939 A1 | 10/2015 | Johnson et al. |

OTHER PUBLICATIONS

Mell et al., "The NIST Definition of Cloud Computing," National Institute of Standards and Technology, Sep. 2011, NIST Special Publication 800-145, pp. 1-7.

IBM: List of IBM Patents or Patent Applications Treated as Related (Appendix P), Feb. 5, 2016, pp. 1-2.

Pending U.S. Appl. No. 15/016,386, filed Feb. 5, 2016, titled "Locale Aware Platform,", pp. 1-37.

* cited by examiner

```
D:\Liberty\wlp>bin\server run
正在 java HotSpot(TM) 64-Bit Server VM V1.6.0_30-b12 (zh_CN) 上启动
defaultServer(WebSphere Application Server 8.5.5.0/wlp)
[AUDIT] CWWKE0001I: 已启动服务器 defaultServer。
[AUDIT] CWWKZ0058I: 正在监视应用程序的 dropins。
[AUDIT] CWWKT0016I: Web 应用程序可用 (default_host): http://localhost:9080/
[AUDIT] CWWKZ0001I: 应用程序 你好 已在 0.891 秒内启动。
[AUDIT] CWWKF0011I: 服务器 defaultServer 已准备就绪，可开始运行智慧地球。
```

FIG. 5A

```
[AUDIT] CWWKE0001I: The server defaultServer has been launched.
[AUDIT] CWWKZ0058I: Monitoring dropins for applications.
[AUDIT] CWWKT0016I: Web application available (default_host): http://
127.0.0.1:63001/
[AUDIT] CWWKZ0001I: Application 你好 started in 1.065 seconds.
[AUDIT] CWWKF0011I: The server defaultServer is ready to run a smarter planet.
```

FIG. 5B

LOCALE AWARE PLATFORM

BACKGROUND

The present invention relates to cloud computing, and more specifically, to a method and a system for handling locale in a Platform-as-a-Service (PaaS) environment.

Platform-as-a-Service (PaaS) is a business mode offering a platform as a service. A PaaS provider can provide platform level products such as operating systems, application servers, and application development environments through the internet as a service to a user. Via the PaaS service, a software developer can develop and deploy a new application without purchasing platform software.

An application available over the internet, for example a web application, needs to be deployed to an application server which, in turn, executes on an operating system; the operating system, in turn, executes in a hardware environment. Both the application server and the operating system are platform level products. In a cloud computing environment, hardware can be provided as a service through Infrastructure-as-a-Service (IaaS), the required hardware environment provided by a virtualized infrastructure, such as a virtual machine. A PaaS cloud computing platform integrates the functions of the application server and the operating system allowing a user to directly develop and deploy his own application on the cloud computing platform without having to build his own platform.

In order to run a user's application on the cloud computing platform, the cloud computing platform analyzes the application pushed by the user to the cloud computing platform to determine the application type and to prepare a corresponding runtime environment appropriate for that application type. The cloud computing platform may also install any applications on which the application depends (dependencies) and may package the application, the runtime environment, and the dependent applications into an executable droplet that it stores in the cloud system. This process is referred to as "staging". The module for staging the application on a cloud computing platform is referred to as a "stager".

When an application is executed on the cloud computing platform, a "runner" module on the cloud computing platform retrieves and extracts the executable droplet to initialize, or boot, the runtime environment, start the application and any dependencies.

With ever increasing diversity and complexity of applications, existing stagers and/or runners may not satisfy the needs of some application or some users. Therefore, it is advantageous to make extend the capabilities of and make improvements to existing stagers and/or runners.

SUMMARY

Embodiments of the present invention disclose a method, computer program product, and system for handling locale information on a computing platform. A computer obtains, in response to an event that an application is pushed to a computing platform, locale information corresponding to the application. The computer determines the type of the application, configures a runtime executable file required by the application according to the locale information corresponding to the application and the type of the application, creates a script for configuring a locale of an operating system on the computing platform consistent with the locale information corresponding to the application, and creates a droplet for the application that includes the configured runtime executable file required by the application and is associated with the created script.

In another aspect of the present invention, the computer retrieves, in response to receiving a request to execute the application, the created script for configuring the locale of the operating system. The computer executes the script on the operating system, and boots the runtime and the application on the operating system.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5A illustrates an exemplary log displayed to a user when an application starts on a traditional computing platform;

FIG. 5B illustrates an exemplary log displayed to a user when an application starts on a PaaS cloud computing platform;

Throughout the drawings, same or similar reference numerals represent the same or similar element.

DETAILED DESCRIPTION

Figure 1:
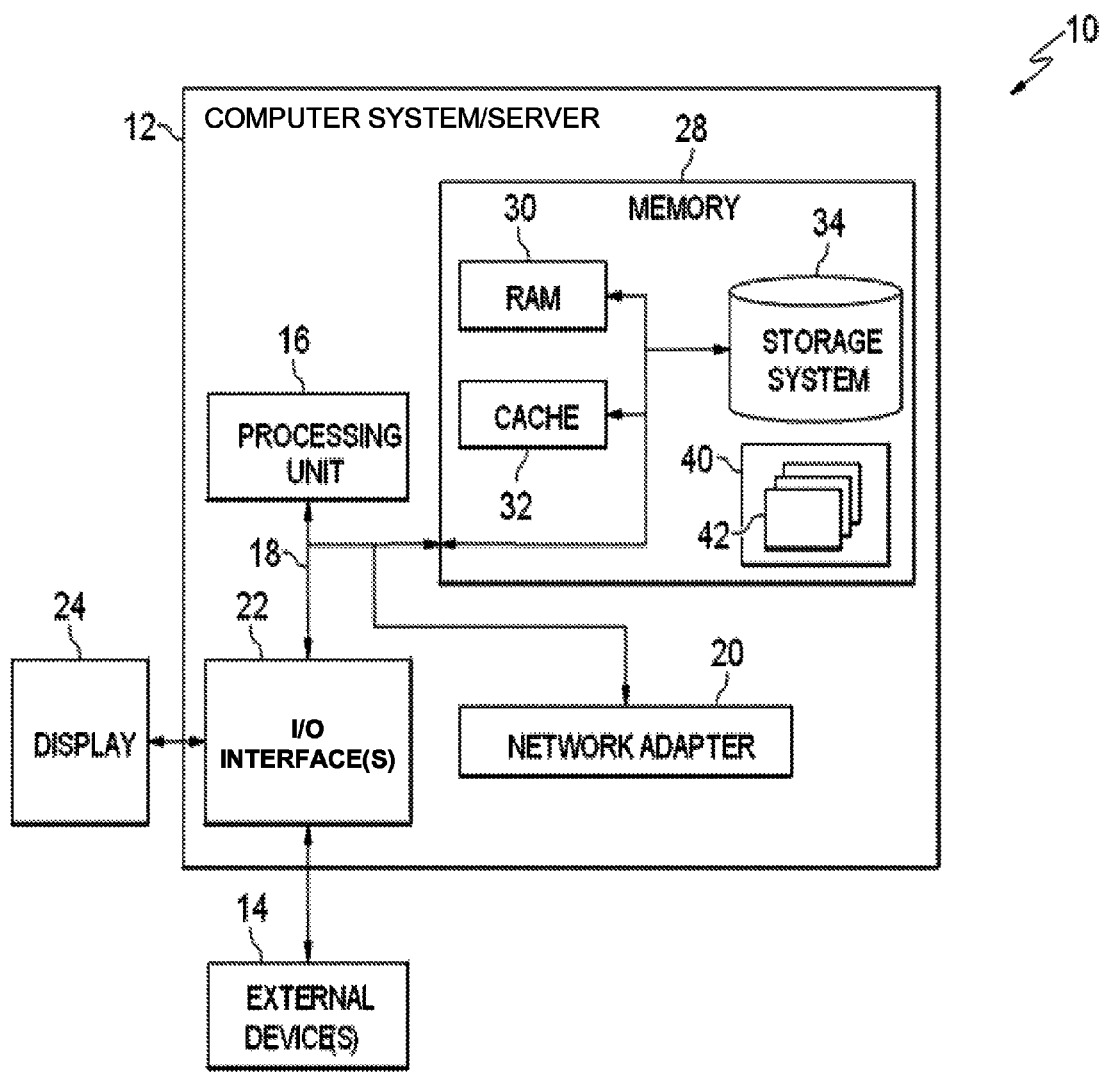
FIG. 1 depicts a cloud computing node, in accordance with an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, which depicts a cloud computing node 10, in accordance with an embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Figure 3:
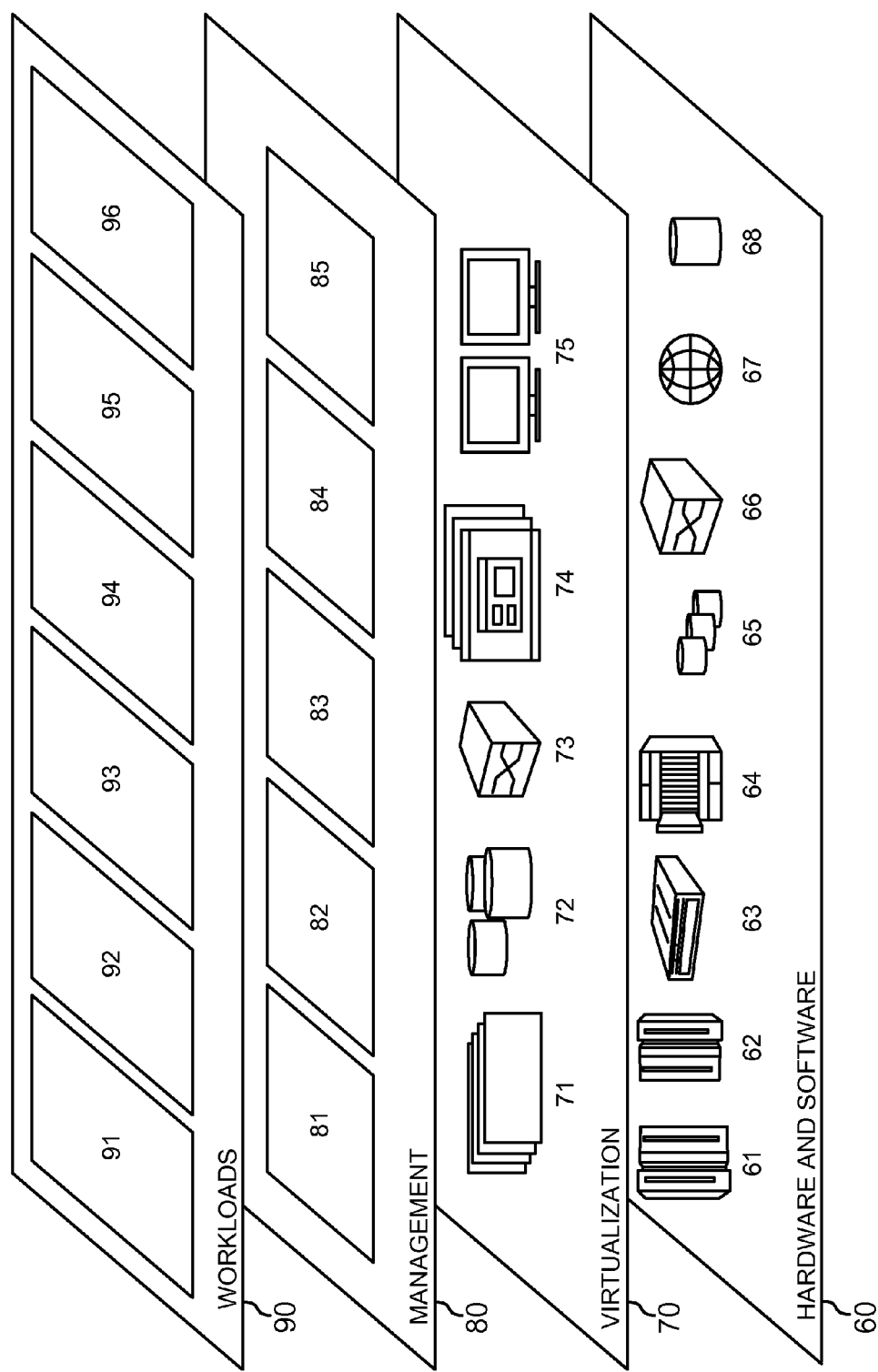
FIG. 3 depicts a block diagram of functional layers of the cloud computing environment of FIG. 2, in accordance with an embodiment of the present invention.

Program/utility 40, having a set (at least one) of program modules 42, may be stored in memory 28 by way of example, and not limitation, as well as an operating system, one or more applications, other program modules, and program data. Each of the operating system, one or more applications, other program modules, and program data or some combination thereof, may include an implementation of a locale aware platform management 96 (FIG. 3). Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Figure 2:
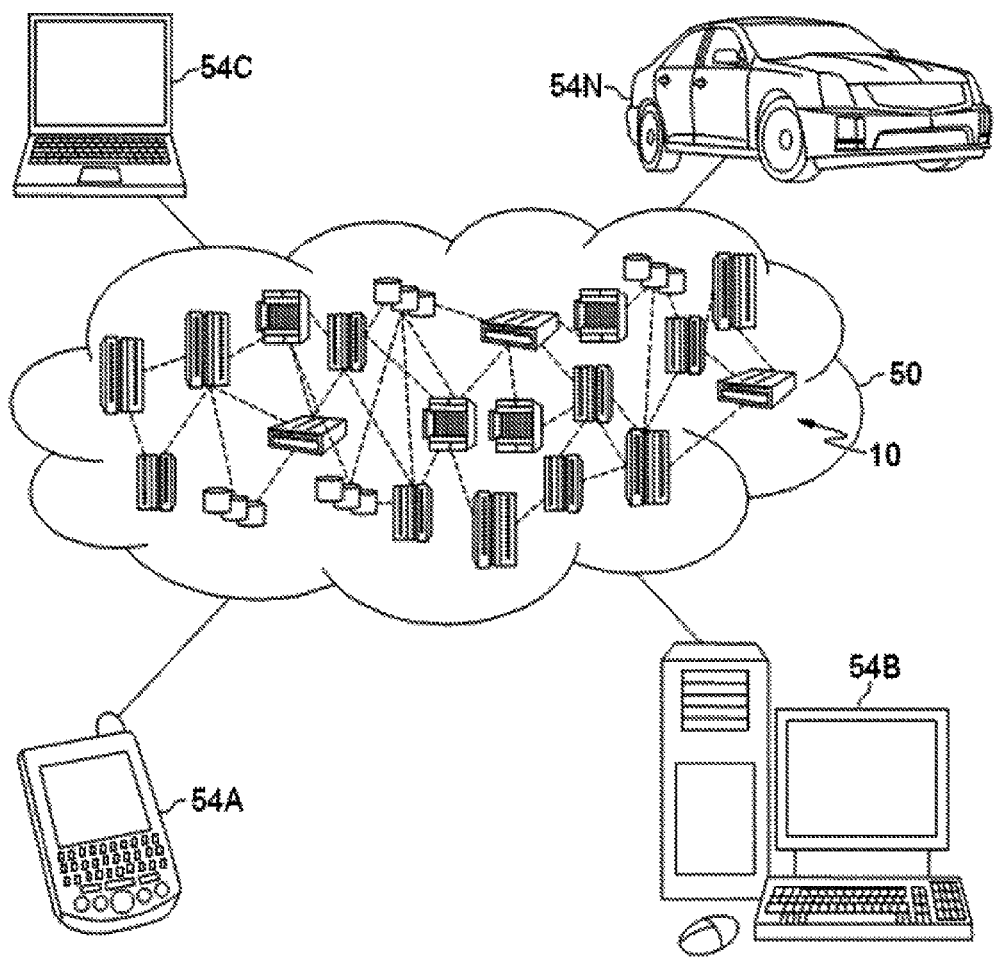
FIG. 2 depicts a cloud computing environment including the computing device of FIG. 1, in accordance with an embodiment of the present invention.

Referring now to FIG. 2, which depicts a cloud computing environment 50 including the computing device 10 of FIG. 1, in accordance with an embodiment of the present invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Referring now to FIG. 3, which depicts a block diagram of functional layers of the cloud computing environment 50 of FIG. 2, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and locale aware platform management 96.

Figure 4:
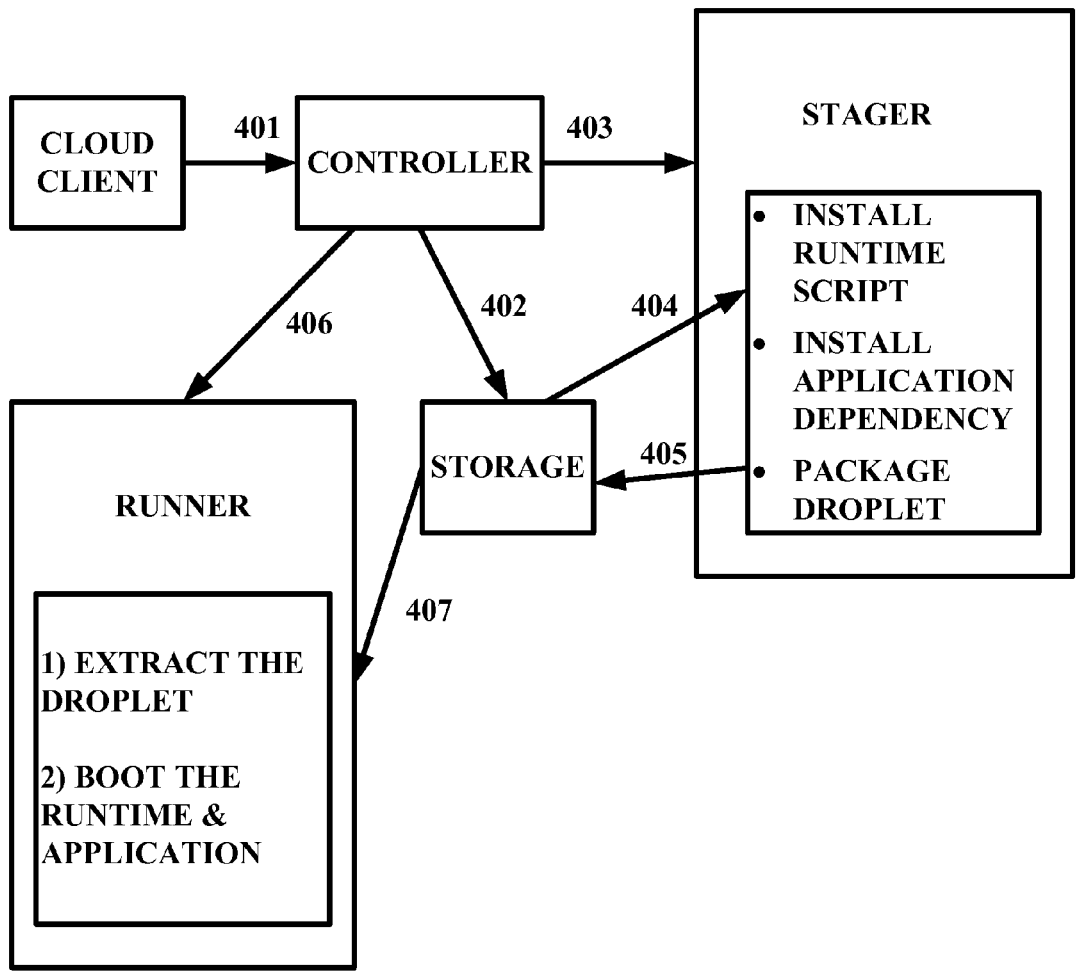
FIG. 4 depicts a flow diagram for staging and running an application, in accordance with an embodiment of the present invention.

FIG. 4 depicts a flow diagram for staging and running an application on a cloud computing platform, in accordance with an embodiment of the present invention. By using a cloud client, for example a browser, a user may deliver (or push), at 401, an application to the cloud computing platform. A controller of the cloud computing platform may receive the user's application and store it, at 402, into storage. At 403, the controller of the cloud computing platform may invoke a stager to stage the application. In various embodiments, the controller may invoke the stager by issuing an instruction to the stager.

On the cloud computing platform, the stager may install, at 404, the runtime executable file, or runtime script, that describes the runtime environment for the user's application and application dependencies. The stager may then package the application from storage, the installed runtime script, and the application dependencies into an executable droplet. Those skilled in the art will appreciate that the application dependencies are optional. The stager, at 405, may store the packaged executable droplet into storage for future execution.

When the application is started, the controller may invoke the runner, at 406, to retrieve the droplet and begin the execution of the application. In various embodiments, the controller may request the runner to begin execution of the application by issuing an instruction to the runner.

At 407, the runner, after retrieving the executable droplet may extract the application, the runtime scripts as well as any of the optional application dependencies from the droplet, in order to boot the runtime environment and the applications.

Those skilled in the art can understand that, depending on the architecture of the cloud computing platform, the cloud client, the cloud controller, the stager, the runner and the storage in FIG. 4 may be implemented as separate entities, while all or some of them may alternately be integrated together.

Locale, which relates to location information, is very important for both the application and the platform on which the application is running. For example, the platform may use the locale to determine a default language, a time zone, and a date format.

On a traditional computing platform, the locale of an application executing on that platform is typically consistent with the locale of the platform itself. In various embodiments, the user who installs an application on the platform may be an administrator of the computing platform with full control of both the application and the platform and may be able to set the locale of the platform before the application is executed.

FIG. 5A illustrates an exemplary log displayed to a user when an application starts on a traditional computing platform. The traditional computing platform in this example is located in China, so the locale of the exemplary platform has been set to Chinese. The user who installs this exemplary application is also located in China, and the application has a Chinese name. It can be seen from the exemplary display of FIG. 5A that the log display is mainly in Chinese.

In a typical cloud computing PaaS platform, the user accesses the PaaS platform from remote clients to push the application to the PaaS platform. While the platform itself may be physically located in one country, the users pushing application to the PaaS platform may be from all over the world, and the locales of the applications pushed by these users may be widely diversified and different than the locale of the cloud computing platform. Typically, the user is not authorized to do PaaS platform administration, and cannot, therefore, set the locale of the platform itself. As such, the locale of the pushed application may be inconsistent with the locale of the platform.

FIG. 5B illustrates an exemplary log displayed to a user when an application starts on a PaaS cloud computing platform whose locale does not match the locale of the application. The cloud computing PaaS platform in this example is located in the United States of America (USA), so the locale of the exemplary platform has been set to English. The exemplary user and application are the same as the user and application in FIG. 5A, the user installing the exemplary application is located in China, and the application has a Chinese name.

It can be seen from the exemplary display of FIG. 5B, that even though the locale of the application is Chinese, the log display is mainly in English. However, since the application name is still displayed in Chinese, it may be inferred that although the PaaS platform has the ability to display Chinese characters, the PaaS platform may not be aware that the log should be displayed in Chinese.

Since the concept of a PaaS platform is application centric, where the user of the PaaS platform should focus on the business logic of its application and the platform should provide as many conveniences as possible to the user, it would be advantageous for a locale aware cloud computing PaaS platform to automatically set the platform locale according to the locale of the application, such that language, time zone, date format, etc. automatically match the application's locale.

A method for processing the application according to an embodiment of the present invention will be described in detail with reference to FIG. 6 and FIG. 7.

Figure 6:
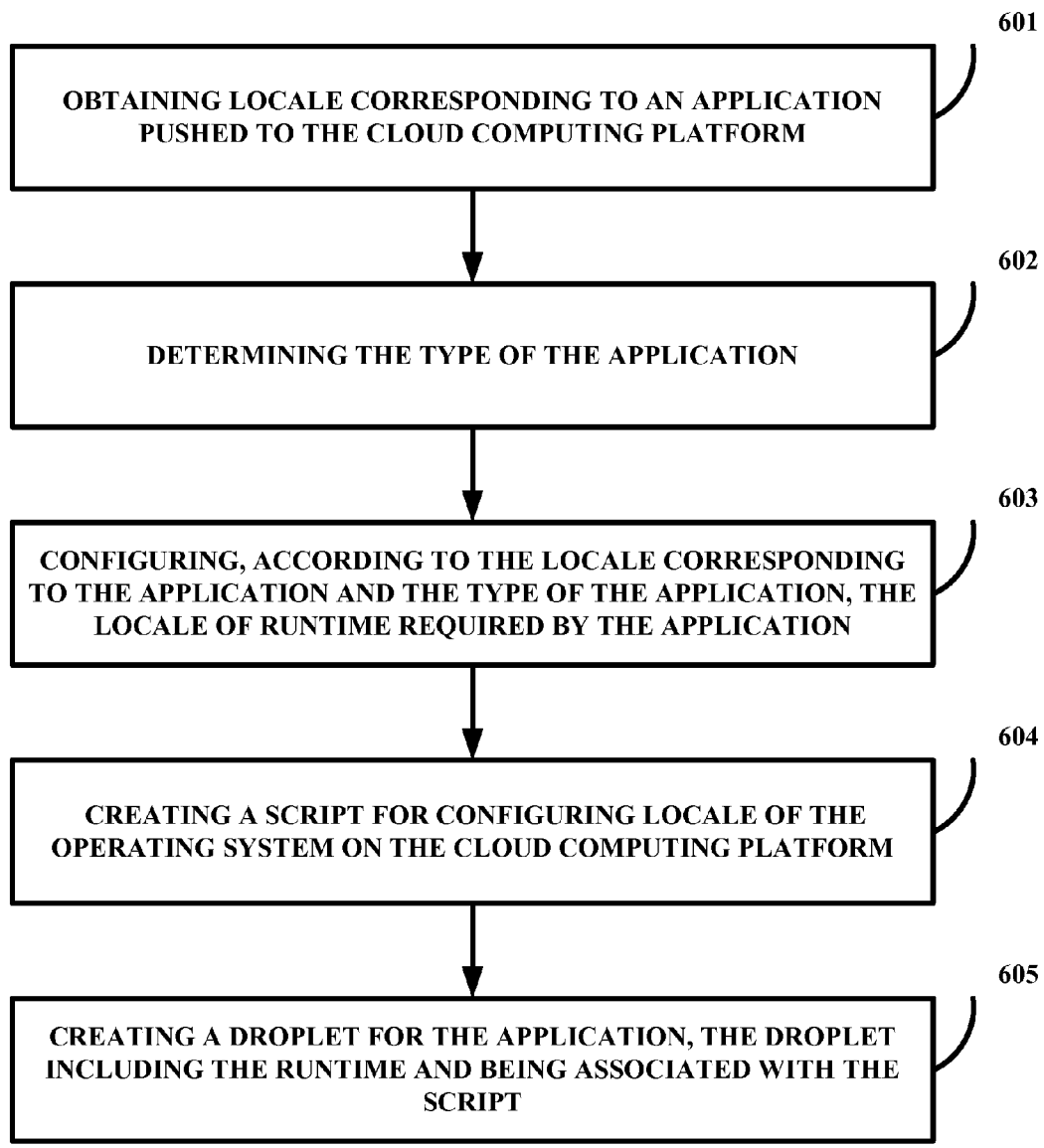
FIG. 6 is a flowchart illustrating the staging of an application on a locale aware cloud computing platform, in accordance with an embodiment of the present invention.

FIG. 6 is a flowchart illustrating the staging of an application on a locale aware cloud computing platform, in accordance with an embodiment of the present invention. Staging an application on a locale aware cloud computing platform may be triggered in response to an event, such as the application being pushed to the locale aware cloud computing platform.

At 601, the platform controller receiving a pushed application may obtain the locale information corresponding to the pushed application. In various embodiments the locale information may identify the locale in which the application was developed and therefore the locale in which it is to be executed. In various embodiments, the locale information may be included in the pushed application. Thus, the information may be extracted by the locale aware cloud computing platform controller directly from the application after the application has been pushed to the locale aware cloud computing platform. Those skilled in the art will appreciate that the application needs to notify the cloud computing platform with the information regarding the type of the application, the required runtime environment, the required dependencies, etc. Similar notification may be employed to enable the locale aware cloud computing platform to obtain the locale information from the application.

In other embodiments, the locale information may be set through a separate instruction from the user, either before or after the application has been pushed to the platform. In one embodiment, the locale aware platform may maintain a profile of each user and may set default locale information in the profile. The platform controller may use the default locale information from the profile as the locale corresponding to all applications pushed by that user, unless otherwise specified by the user.

At 602, the stager may determine the type of application pushed to the locale aware cloud computing platform. Applications pushed, or uploaded, to the cloud computing platform may be, for example, Java applications, node.js applications, or ruby applications. Stagers of a cloud computing platform are typically specific for each application type. A single cloud computing platform may include a plurality of stagers, each processing a different type of application. For example, there may be a Java stager for Java applications deployed on the cloud computing platform and there may be a node.js stager for node.js applications. After an application has been pushed to the cloud computing platform, the cloud computing platform controller may invoke the stager for processing that type of application. The stager may be enabled to discover whether the application can be processed by it. When the stager determines that it can process the application based on its type, the stager may perform application staging on that application.

At 603, the stager configures the runtime locale required by the application according to the locale information corresponding to the application and the type of application. Different types of applications may have different runtime scripts to establish the runtime environment. For example, a Java application requires a Java runtime script. Setting the runtime locale depends on which runtime script is used.

Below is an exemplary code sample, in a runtime script, for configuring the runtime environment, including runtime locale, required by a Java application. In this example, that the runtime locale corresponding to the application is China.

| Java Runtime Code Sample |
| --- |
| wlp/etc/jvm.options<br># Set a system property.<br>-Duser.language=zh<br>-Duser.country=CN<br>-Duser.variant=<br>-Duser.region= |

Those skilled in the art can appreciate that for other application types, such as ruby and node.js, the method of setting the runtime locale in the runtime scripts may be different. However, setting locale can typically be performed by using the runtime configuration files or by setting the environment variables of the runtime.

In various embodiments, there may be a plurality of versions of the runtime configuration files, each corresponding to a different locale. For example, there may be a Java Chinese version configuration file, an English version configuration file, and a Spanish version configuration file. There may be a node.js runtime with a Chinese version and an English version. In such a situation, configuring the runtime locale may require the application to select the appropriate version.

At 604, various embodiments of the present invention may create a locale script for configuring the locale of the operating system executing on the locale aware cloud computing platform to match the runtime locale of an application. As described above, in order for messages and logs, such as the exemplary log of FIGS. 5A and 5B, to be presented to the user in the proper language, the operating system of the locale aware cloud computing platform needs to be set to the locale that corresponds to the executing application. Typically, as noted above, the user does not have control over the locale of the platform or the operating system executing on the platform. Various embodiments of the present invention, therefore provide a new mechanism, for example, by creating a locale script, to communicate the locale information from the application to the operating system. The locale script may be used by the platform runner to set the platform locale to match the locale of the application.

The locale script may be a set of command lines or instructions that can be executed by the operating system of the locale aware cloud computing platform. The locale script may automate the execution of tasks that could alternatively be executed by an administrator and allows a user, other than the administrator, to set the preferred platform locale for their application.

The actual locale script for configuring the platform locale for the operating system may vary depending on the operating system of the locale aware cloud computing platform.

Below is an exemplary code sample for a locale script for configuring the platform locale for a Linux-based operating system.

| Linux Locale Script Code Sample |
| --- |
| ubuntu.sh:<br># Generate and setup default locale (en__US.UTF-8)<br>locale-gen en__US.UTF-8<br>update-locale LANG="en__US.UTF-8"<br>export LANG=en__US.UTF-8<br>export LANGUAGE=en__US:en<br>export LC__CTYPE="en__US.UTF-8"<br>export LC__NUMERIC="en__US.UTF-8"<br>export LC__TIME="en__US.UTF-8"<br>export LC__COLLATE="en__US.UTF-8"<br>export LC__MONETARY="en__US.UTF-8"<br>export LC__MESSAGES="en__US.UTF-8"<br>export LC__PAPER="en__US.UTF-8"<br>export LC__NAME="en__US.UTF-8"<br>export LC__ADDRESS="en__US.UTF-8"<br>export LC__TELEPHONE="en__US.UTF-8"<br>export LC__MEASUREMENT="en__US.UTF-8"<br>export LC__IDENTIFICATION="en__US.UTF-8"<br>export LC__ALL= |

In various embodiments, there may be a plurality of locale scripts, each corresponding to a possible locale. For example, there may be a locale script to set the locale to the China mainland, a locale script to set the locale to China Hong Kong, a locale script to set the locale to Germany, a locale script to set the locale to US EST, a locale script to set the locale to US PST, etc. After the stager obtains the locale information corresponding to the application, at 601, the stager may select an appropriate locale script to set the platform locale to be used to configure locale of the operating system for the application.

In other embodiments, stager may modify a template to include the locale information obtained at 601.

At 605, the stager may create a droplet for the application that includes the runtime scripts for the application, the application, the application dependencies, and may associate the droplet with the locale script created at 604. In certain embodiments, the locale script created at 604 may be contained in the droplet itself. In other embodiments, the locale script created at 604 may be stored separately from the droplet and associated with the droplet. Because the droplet is an executable package, when the application execution begins, the droplet will be executed on the operating system, allowing the locale script to be executed to set the appropriate locale for the platform.

Figure 7:
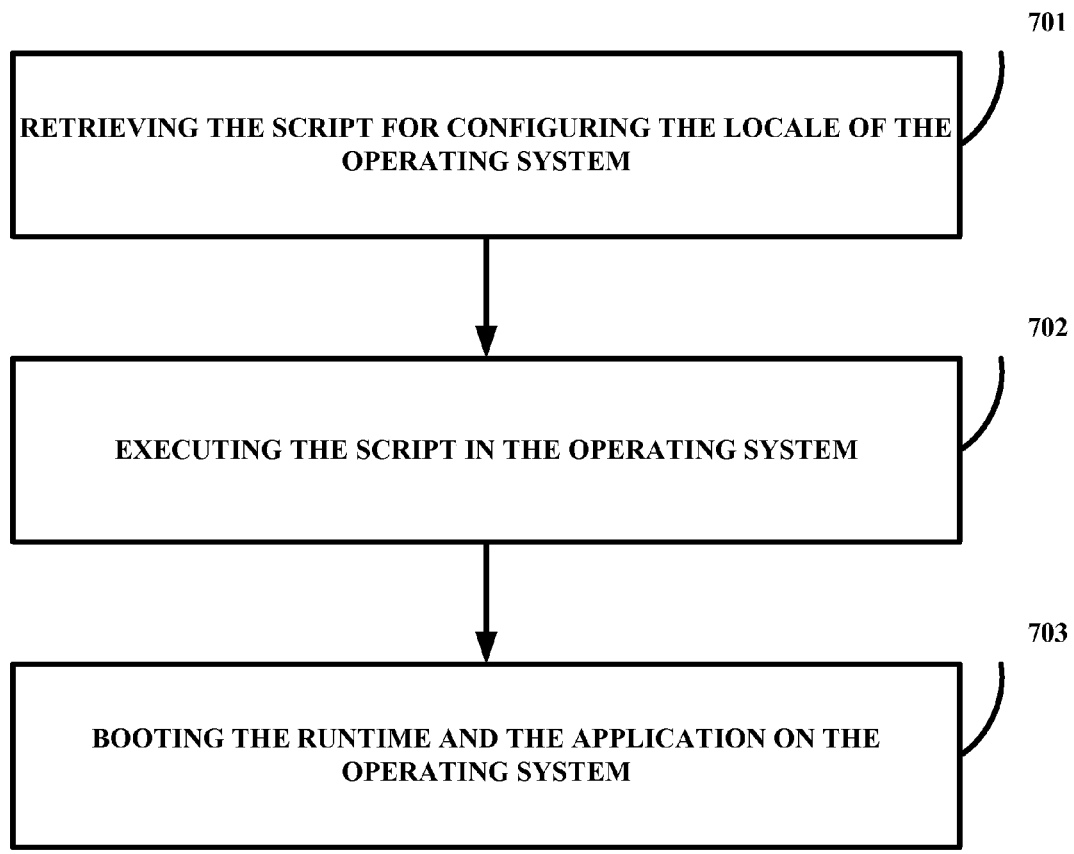
FIG. 7 is a flowchart illustrating the running of an application on a locale aware cloud computing platform, in accordance with an embodiment of the present invention.

FIG. 7 is a flowchart illustrating the running of an application on a locale aware cloud computing platform, in accordance with an embodiment of the present invention. Running an application on a locale aware cloud computing platform may be triggered in response to the platform controller receiving an instruction to run the application.

At 701, the runner may retrieve the locale script associated with the application from storage and execute the script to set the locale of the platform and configure the locale of the operating system. In an embodiment in which the locale script is stored separately from the droplet, the runner may retrieve the script from storage before the droplet is extracted. In other embodiments in which the locale script is included in the droplet, the droplet may be extracted from storage to retrieve the locale script.

The runner may execute the locale script on the locale aware cloud computing platform to set the required locale for the application, at 702. Those skilled in the art can easily figure out how to execute a script in an operating system.

At 703, the runner may boot the runtime environment and the application on the operating system of the locale aware cloud computing platform. Because the locale script has been executed on the operating system, the operating system may be configured to have the same locale as the application and when the runner boots that application from the droplet establishing the runtime environment that matches the, now, locale configured operating system, messages displayed by the application may be presented to the user in the language, time zone, date format, etc. consistent with the locale of the application.

In various embodiments, the runner may create a container to host the application. The container is a form of operating system virtualization that provides an application executing in the container with resources as if the application is the only application executing on the operating system. The relationship between a container and the operating system is similar to the relationship between a virtual machine and a physical machine. Containers created on the same operating system are isolated from each other, therefore applications executing in separate containers are also isolated from each other.

If various applications requiring different locales execute directly, and simultaneously, on the same operating system in a locale aware cloud computing platform, the applications may interfere with one another. For example, a first application may require the locale set to China while a second application, simultaneously executing on the same operating system, may require the locale set to US. It may be impractical to configure the locale of the operating system to both China and US. In various embodiments, containers may be used to share the operating system among the various applications, each container configured with a different locale. The locale of the container hosting the first application may be set to China while the locale of the container hosting the second application may be set to US. In this embodiment, an appropriate locale script may be executed in each container, at 702.

Figure 8:
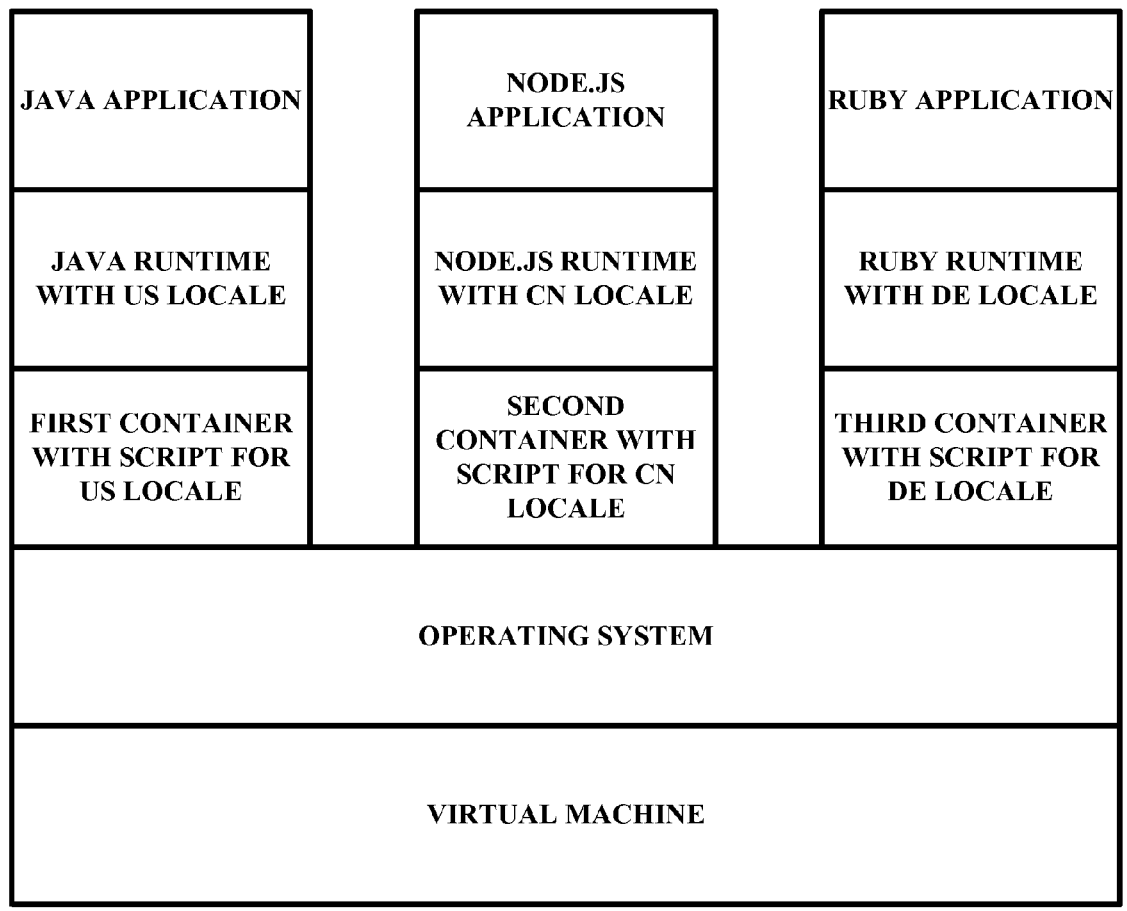
FIG. 8 illustrates and exemplary high-level architecture of a locale aware cloud computing platform, in accordance with an embodiment of the present invention.

FIG. 8 illustrates and exemplary high-level architecture of a locale aware cloud computing platform, in accordance with an embodiment of the present invention. The exemplary high level architecture depicts 3 locale sensitive applications executing on a locale aware cloud computing platform. The three applications, a Java application with a locale of US, a node.js application with a locale of China, and a ruby application with a locale of Germany, have been pushed to the locale aware cloud computing platform. Each of the three applications may have been individually pushed to the platform. The exemplary Java application is depicted as executing in a first container, the first container may have been configured by the locale script for the US locale and the runtime environment in the first container is a Java runtime with the same US locale. The exemplary node.js application is depicted as executing in a second container, the second container may have been configured by the locale script for the China locale, and the runtime environment in the second container is a node.js runtime with the same China locale. The exemplary ruby application is depicted as executing in a third container, the third container may have been configured by the locale script for the German locale, and the runtime environment in the third container is a ruby runtime with the same German locale. The three containers are all running on the same operating system, but are isolated from each other in separate containers. The operating system is executing on a virtual machine.

Various embodiments of the present invention have been described above with reference to the drawings. Those skilled in the art will appreciate that, the above method may be implemented either in software or in hardware or in a combination thereof. Furthermore, those skilled in the art will appreciate that, by implementing various steps of the above method in software, hardware or a combination thereof, a system in which program modules are deployed based on a same inventive concept may be provided. Although hardware structure of that system is the same as that of a generic processing device, that system shows features distinguished from the generic processing device due to functions of the software included therein, thereby forming an apparatus of embodiments of the present invention. The apparatus of the present invention comprises several units or modules, which are configured to perform corresponding steps. Those skilled in the art may understand how to write a program to realize actions performed by the units or the modules through reading the specification. Since the system is based on the same inventive concept as the method, same or corresponding implementation details therein are also applicable to the apparatus corresponding to the above method, which may not be described hereinafter for brevity, since they have been specifically and completely described hereinabove.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. 1-8 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially and concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for handling locale information in a cloud computing environment, the method comprising:
    receiving, by a first computing platform in the cloud computing environment, an application that is pushed by a cloud client to the first computing platform, in response to receiving, by the cloud client, a request from a user to execute the application;

retrieving, by the first computing platform, in response to receiving the pushed application, locale information related to the physical location of the cloud client that pushed the application, and locale information related to the physical location of the user;

creating, by the first computing platform, a script for configuring a locale of an operating system on a second computing platform in the cloud computing environment consistent with the locale information related to the physical location of the cloud client that pushed the application;

identifying, by the first computing platform, one or more applications upon which the pushed application depends for execution;

creating, by the first computing platform, a droplet that includes the created script, the pushed application, and the one or more applications upon which the pushed application depends for execution;

retrieving, by the second computing platform in the cloud computing environment, the droplet;

extracting and executing, by the second computing platform, the droplet, whereby the operating system of the second computing platform is configured consistent with the locale information related to the physical location of the cloud client that pushed the application and the locale information related to the physical location of the user, and the one or more applications upon which the pushed application depends for execution are installed;

booting, by the second computing platform, a runtime environment, the pushed application, and the one or more applications upon which the pushed application depends for execution in the runtime environment; and executing, by the second computing platform in the runtime environment, the pushed application, whereby information presented to the cloud client is consistent with the locale information related to the physical location of the cloud client that pushed the application, and the locale information related to the physical location of the user.

2. The method according to claim 1, wherein the operating system is a virtual operating system in the form of a container.

3. The method of according to claim 1, wherein retrieving, by the first computing platform, the locale information corresponding to the application pushed to the computing platform is selected from the group consisting of:
retrieving, by the first computing platform, the locale information from the application;
retrieving, by the first computing platform, the locale information from an instruction sent to the computing platform; and
retrieving, by the first computing platform, the locale information from a profile of a user pushing the application to the computing platform.

4. The method according to claim 1, wherein creating, by the first computing platform, the script for configuring the locale of the operating system on the second computing platform consistent with the locale information corresponding to the application further comprises:
modifying, by the first computing platform, a template to include the locale information.

5. A computer program product for handling locale information in a cloud computing environment, the computer program product comprising one or more computer readable storage medium and program instructions stored on at least one of the one or more computer readable storage medium, the program instructions comprising:
program instructions to receive, by a first computing platform in the cloud computing environment, an application that is pushed by a cloud client to the first computing platform, in response to receiving, by the cloud client, a request from a user to execute the application;
program instructions to retrieve, by the first computing platform, in response to receiving the pushed application, locale information related to the physical location of the cloud client that pushed the application, and locale information related to the physical location of the user;
program instruction to create, by the first computing platform, a script for configuring a locale of an operating system on a second computing platform in the cloud computing environment consistent with the locale information related to the physical location of the cloud client that pushed the application;
program instructions to identify, by the first computing platform, one or more applications upon which the pushed application depends for execution;
program instruction to create, by the first computing platform, a droplet that includes the created script, the pushed application, and the one or more applications upon which the pushed application depends for execution;
program instructions to retrieving, by the second computing platform in the cloud computing environment, the droplet;
program instructions to extract and execute, by the second computing platform, the droplet, whereby the operating system of the second computing platform is configured consistent with the locale information related to the physical location of the cloud client that pushed the application and locale information related to the physical location of the user, and the one or more applications upon which the pushed application depends for execution are installed;
program instructions to boot, by the second computing platform, a runtime environment, the pushed application, and the one or more applications upon which the pushed application depends for execution in the runtime environment; and
program instructions to execute, by the second computing platform in the runtime environment, the pushed application, whereby information presented to the cloud client is consistent with the locale information related to the physical location of the cloud client that pushed the application, and the locale information related to the physical location of the user.

6. The computer program product according to claim 5, wherein the operating system is a virtual operating system in the form of a container.

7. The computer program product according to claim 5, wherein program instruction to retrieve, by the first computing platform, the locale information corresponding to the application pushed to the computing platform is selected from the group consisting of:
program instructions to retrieve, by the first computing platform, the locale information from the application;
program instructions to retrieve, by the first computing platform, the locale information from an instruction sent to the computing platform; and program instructions to retrieve, by the first computing platform, the locale information from a profile of a user pushing the application to the computing platform.

8. The computer program product according to claim 5, wherein program instruction to create, by the first computing platform, the script for configuring the locale of the operating system on the second computing platform consistent with the locale information corresponding to the application further comprises:
program instructions to modify, by the first computing platform, a template to include the locale information.

9. A computer system for handling locale information in a cloud computing environment, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
program instructions to receive, by a first computing platform in the cloud computing environment, an application that is pushed by a cloud client to the first computing platform, in response to receiving, by the cloud client, a request from a user to execute the application;
program instructions to retrieve, by the first computing platform, in response to receiving the pushed application, locale information corresponding to the pushed application, and locale information of the user;
program instruction to create, by the first computing platform, a script for configuring a locale of an operating system on a second computing platform in the cloud computing environment consistent with the locale information related to the physical location of the cloud client that pushed the application;
program instructions to identify, by the first computing platform, one or more applications upon which the pushed application depends for execution;
program instruction to create, by the first computing platform, a droplet that includes the created script, the pushed application, and the one or more applications upon which the pushed application depends for execution;
program instructions to retrieving, by the second computing platform in the cloud computing environment, the droplet;
program instructions to extract and execute, by the second computing platform, the droplet, whereby the operating system of the second computing platform is configured consistent with the locale information related to the physical location of the cloud client that pushed the application and locale information related to the physical location of the user, and the one or more applications upon which the pushed application depends for execution are installed;
program instructions to boot, by the second computing platform, a runtime environment, the pushed application, and the one or more applications upon which the pushed application depends for execution in the runtime environment; and
program instructions to execute, by the second computing platform in the runtime environment, the pushed application, whereby information presented to the cloud client is consistent with the locale information related to the physical location of the cloud client that pushed the application, and the locale information related to the physical location of the user.

10. The computer system according to claim 9, wherein the operating system is a virtual operating system in the form of a container.

11. The computer system according to claim 9, wherein program instruction to retrieve, by the first computing platform, the locale information corresponding to the application pushed to the computing platform is selected from the group consisting of:
program instructions to retrieve, by the first computing platform, the locale information from the application;
program instructions to retrieve, by the first computing platform, the locale information from an instruction sent to the computing platform; and
program instruction to retrieve, by the first computing platform, the locale information from a profile of a user pushing the application to the computing platform.

12. The computer system according to claim 9, wherein program instructions to create, by the first computing platform, the script for configuring the locale of the operating system on the second computing platform consistent with the locale information corresponding to the application further comprises:
program instructions to modify, by the first computing platform, a template to include the locale information.

* * * * *